US012640371B2

(12) United States Patent
Wen et al.

(10) Patent No.: US 12,640,371 B2
(45) Date of Patent: May 26, 2026

(54) NEGATIVE ELECTRODE ACTIVE MATERIAL MODIFIED BY ZWITTERIONIC POLYMER, AND PREPARATION METHOD AND APPLICATIONS THEREOF

(71) Applicant: BBL Technology Corporation, Kaohsiung City (TW)

(72) Inventors: Ten-Chin Wen, Tainan City (TW); Tsung-Tien Cheng, Kaohsiung City (TW)

(73) Assignee: BBL TECHNOLOGY CORPORATION, Kaohsiung City (TW)

( * ) Notice: Subject to any disclaimer, the term of this patent is extended or adjusted under 35 U.S.C. 154(b) by 542 days.

(21) Appl. No.: 18/236,174

(22) Filed: Aug. 21, 2023

(65) Prior Publication Data

US 2024/0243287 A1 Jul. 18, 2024

(30) Foreign Application Priority Data

Jan. 13, 2023 (TW) ................................ 112101649

(51) Int. Cl.

| | |
|---|---|
| ***H01M 4/62*** | (2006.01) |
| ***C08B 3/16*** | (2006.01) |
| ***C08B 37/08*** | (2006.01) |
| ***H01M 4/02*** | (2006.01) |
| ***H01M 4/36*** | (2006.01) |
| ***H01M 4/38*** | (2006.01) |

(Continued)

(52) U.S. Cl.
CPC ................. *H01M 4/62* (2013.01); *C08B 3/16* (2013.01); *C08B 37/003* (2013.01); *H01M 4/366* (2013.01); *H01M 4/386* (2013.01); *H01M 4/485* (2013.01); *H01M 4/587* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2021/0384492 A1 12/2021 Kwon et al.

FOREIGN PATENT DOCUMENTS

CN 114409894 A 4/2022
CN 116130628 A * 5/2023 ............ H01M 4/366

(Continued)

OTHER PUBLICATIONS

Yue et al, CN 116130628 A, English Translation from FIT (Year: 2023).*

*Primary Examiner* — Colin W. Slifka
(74) *Attorney, Agent, or Firm* — WPAT, PC

(57) ABSTRACT

The present invention provides a negative electrode active material modified by zwitterionic polymer, which comprises a negative electrode active powder and a nano-scaled layer of zwitterionic polymer coated on the negative electrode active powder. Besides, the present invention also relates to the preparation method and applications of the above-mentioned negative electrode active material. The replacement of the negative electrode active material used in conventional cells with the negative electrode active material modified by zwitterionic polymer of the present invention benefits ion insertion and extraction, reduces irreversible reaction and prolongs cycle life of cells, thereby enhancing overall effectiveness of cells.

12 Claims, 19 Drawing Sheets

(51) Int. Cl.
*H01M 4/485* (2010.01)
*H01M 4/587* (2010.01)

(56) References Cited

FOREIGN PATENT DOCUMENTS

| | | | |
|---|---|---|---|
| TW | 202209732 | A | 3/2022 |
| WO | 2015 177830 | A1 | 11/2015 |

* cited by examiner

NEGATIVE ELECTRODE ACTIVE MATERIAL MODIFIED BY ZWITTERIONIC POLYMER, AND PREPARATION METHOD AND APPLICATIONS THEREOF

CROSS-REFERENCE TO RELATED APPLICATION

Pursuant to 35 U.S.C. § 119(a), this application claims the benefit of the priority to Taiwan Patent Application No. 112101649, filed on Jan. 13, 2023. The content of the prior application is incorporated herein by its entirety.

BACKGROUND OF THE INVENTION

1. Field of the Invention

The present invention relates to a negative electrode active material, particularly a negative electrode active material modified by zwitterionic polymer. Besides, the present invention also relates to the preparation method and applications of such negative electrode active material.

2. Description of the Prior Arts

With the rapid development of science and technology and the problems of energy shortage, the development and improvement of energy storage technology have been progressively researched in the industry. Lithium ion batteries (LIBs) have the advantages of high energy density, high capacity, high voltage and no memory effect, so they have been widely applied in electronic products such as smart phones, notebooks and the like.

To improve the properties of lithium ion batteries, recent studies have focused on the surface modification or coating of the electrode materials used in lithium ion batteries. One of the technical means includes coating an organic sugar on the positive electrode material and then heating for dehydrogenation to leave a carbon conductive coating layer, so that the electron conductivity of the positive electrode material can be enhanced. Another technical means includes coating asphalt on the surface of graphite, and graphitizing the coating layer by high temperature heat treatment to improve the capacity per gram and properties of graphite.

However, there is another technical problem to be solved for lithium ion batteries: how to enhance initial coulomb efficiency (ICE), which is the ratio of discharge capacity and charge capacity in the first charging and discharging cycle of a lithium ion battery. There are two reasons resulting in decreased ICE: one is the generation of the solid electrolyte interface (SEI), and one is the irreversible lithium insertion reaction occurring at the negative electrode. Although the current surface modification or coating methods can enhance conductivity or capacity per gram, it is still unknown if they benefit the ICE enhancement of lithium ion batteries.

Therefore, a novel surface modification or coating method is still needed to further enhance the efficacy of lithium ion batteries.

SUMMARY OF THE INVENTION

One purpose of the present invention is to provide a surface modification or coating method of a negative electrode active material in order to enhance cell effectiveness in which the negative electrode active material is applied on the cell.

To achieve the above-mentioned purpose, the present invention provides a negative electrode active material modified by zwitterionic polymer, which comprises a negative electrode active powder and a nano-scaled layer of zwitterionic polymer coated on the negative electrode active powder.

In the present invention, nano-scaled layer of zwitterionic polymer is used to coat on the negative electrode active powder. The zwitterionic polymer comprised in the coating layer has high polarity because it simultaneously includes a positive ion group and a negative ion group, so the coating layer can be penetrated by ions and the likelihood that the solvent is introduced into and reacted with the negative electrode active powder is reduced. Also, the nano-scaled layer of zwitterionic polymer plays the role of the SEI membrane which is usually generated on the surface of electrodes of lithium ion batteries after charging, so the irreversible capacitance loss resulting from SEI membrane generation can be avoided. This is advantageous for enhancing coulombic efficiency, even initial coulombic efficiency (ICE); and the cycle life of cells can be prolonged. Besides, in the present invention, the zwitterionic structure of the zwitterionic polymer comprised in the coating layer forms an ion conduction channel which is advantageous for ion insertion and extraction and enhancement of cell stability and cycle life.

In addition, the negative electrode active material modified by zwitterionic polymer of the present invention does not swell when impregnated in the electrolyte solution or solvent of the cell. This shows that the nano-scaled layer of zwitterionic polymer does not absorb the electrolyte solution or solvent, and the deterioration resulting from swelling occurring after many charging and discharging cycles of a lithium ion battery can be avoided, so the cell has better stability.

According to the present invention, the negative electrode active powder may be lithium titanate (LTO) powder, a carbon-containing material powder or a silicon-containing material powder. Specifically, the negative electrode active powder may be LTO powder, mesocarbon microbead (MCMB) powder (such as mesophase graphite powder), artificial graphite powder, natural graphite powder, hard carbon powder, soft carbon powder, silicon powder (i.e., pure silicon powder), silicon oxide ($SiO_x$) powder, silicon carbide (SiC) powder or a combination thereof, but is not limited thereto. The negative electrode active powder may have a diameter of 10 nanometers (nm) to 30 micrometers (μm).

In the zwitterionic polymer, according to the present invention, the positive ion group may be a positively-charged group such as a primary amino group ($—NH_2$), a secondary amino group (—NHR), a tertiary amino group ($—NR_2$) or a quaternary amino group ($—NR_3^+$); and the negative ion group may be a negatively-charged group such as a carboxylate group ($—COO^-$), a sulfonate group ($—SO_3^-$), and a phosphate group ($—PO_4^-$). In one of the embodiments, the number of the positive ion group and the number of the negative ion group may be the same or different.

In one of the embodiments, the zwitterionic polymer may be carboxylated chitosan, which simultaneously has $—NH_2$ as the positive ion group, and a carboxylate group as the negative ion group. Specifically, the carboxylated chitosan may be, but is not limited to, O-carboxymethyl chitosan (CCS).

In another embodiment, the zwitterionic polymer may be a polysaccharide or a derivative thereof modified by a molecule comprising a zwitterionic structure, i.e., a polysaccharide modified by a molecule comprising a zwitterionic structure, or a derivative of polysaccharide which is modified by a molecule comprising a zwitterionic structure; the molecule comprising a zwitterionic structure may be carboxybetaine methacrylate (CBMA), phosphobetaine methacrylate (PBMA), sulfobetaine methacrylate (SBMA) or a combination thereof; and the polysaccharide or a derivative thereof may be cellulose, agar, alginic acid, starch, glycogen, heparin, chondroitin sulfate, chitin (CH), chitosan (CS), carboxymethyl cellulose (CMC), carboxylated chitosan, phosphorylated chitosan (PCS) or a combination thereof, but is not limited thereto.

In one of the embodiments, the nano-scaled layer of zwitterionic polymer may have a thickness of 10 nm to 1000 nm. In other embodiments, the nano-scaled layer of zwitterionic polymer may have a thickness of 10 nm to 100 nm.

In one of the embodiments, the weight percentage of the nano-scaled layer of zwitterionic polymer relative to the negative electrode active powder is 0.005% by weight (wt %) to 10 wt %. In other embodiments, the weight percentage of the nano-scaled layer of zwitterionic polymer relative to the negative electrode active powder may be 0.1 wt % to 3 wt %.

To achieve the above-mentioned purpose, the present invention also provides a preparation method of a negative electrode active material modified by zwitterionic polymer, which comprises the following steps:

adding a negative electrode active powder into a zwitterionic polymer aqueous solution to obtain a mixture; and crosslinking the mixture at a temperature of 80° C. to 90° C. to obtain a resultant product, and drying the resultant product to obtain the negative electrode active material modified by zwitterionic polymer; wherein the negative electrode active material modified by zwitterionic polymer comprises the negative electrode active powder and a nano-scaled layer of zwitterionic polymer coated on the negative electrode active powder.

With the preparation method according to the present invention, the zwitterionic polymer alone may form a nano-scaled layer of zwitterionic polymer after crosslinking, and the nano-scaled layer of zwitterionic polymer would be coated on the surface of the negative electrode active powder, thereby modifying the surface of the negative electrode active powder by the zwitterionic polymer. With the preparation method of the present invention, the nano-scaled layer of zwitterionic polymer is coated on the surface of the negative electrode active powder during the crosslinking reaction, so the nano-scaled layer of zwitterionic polymer is tightly coated on the negative electrode active powder and the nano-scaled layer is insoluble in a solvent or water. Thus, coating a nano-scaled layer of zwitterionic polymer on the surface of the negative electrode active powder benefits ion insertion and extraction, reduces irreversible reaction and prolongs cycle life of cells, thereby enhancing overall effectiveness of cells.

In one of the embodiments, the preparation method comprises:

carboxylating chitosan to obtain a first reaction solution;

adjusting the first reaction solution to a pH value between pH 2 and pH 10 to obtain an adjusted first reaction solution; and dialyzing the adjusted first reaction solution with a dialysis bag for molecular weight cut-off of 6000 to 10000, to obtain the zwitterionic polymer aqueous solution. In this embodiment, the zwitterionic polymer comprised in the zwitterionic polymer aqueous solution may be carboxylated chitosan.

In another embodiment, the preparation method comprises:

reacting a polysaccharide or a derivative thereof with a molecule comprising a zwitterionic structure to obtain a second reaction solution, wherein the polysaccharide or a derivative thereof may be cellulose, agar, alginic acid, starch, glycogen, heparin, chondroitin sulfate, chitin, chitosan, carboxymethyl cellulose, carboxylated chitosan, phosphorylated chitosan or a combination thereof; the molecule comprising a zwitterionic structure may be carboxybetaine methacrylate, phosphobetaine methacrylate, sulfobetaine methacrylate or a combination thereof;

adjusting the second reaction solution to a pH value between pH 8 and pH 14 to obtain an adjusted second reaction solution; and dialyzing the adjusted second reaction solution with a dialysis bag for molecular weight cut-off of 6000 to 10000, to obtain the zwitterionic polymer aqueous solution. In this embodiment, the zwitterionic polymer comprised in the zwitterionic polymer aqueous solution may be a polysaccharide or a derivative thereof modified by a molecule comprising a zwitterionic structure.

Optionally, the first and second reaction solutions may independently have a viscosity of 500 cP to 1500 cP, but it is not limited thereto.

In one of the embodiments, the weight percentage of the zwitterionic polymer comprised in the zwitterionic polymer aqueous solution relative to the negative electrode active powder is 0.005 wt % to 10 wt %. In other embodiments, the weight percentage of the zwitterionic polymer comprised in the zwitterionic polymer aqueous solution relative to the negative electrode active powder may be 0.1 wt % to 3 wt %.

According to the preparation method of the present invention, the negative electrode active material modified by zwitterionic polymer, which is prepared by crosslinking and drying, may have a diameter of 10 nm to 30 μm. In one of the embodiments, the negative electrode active material modified by zwitterionic polymer may be a negative electrode active material in powder form, and the surface of the negative electrode active powder may be coated with a nano-scaled layer of zwitterionic polymer.

The present invention also provides a negative electrode, which comprises the above-mentioned negative electrode active material modified by zwitterionic polymer. Specifically, the negative electrode active material modified by zwitterionic polymer can be coated on an electrode sheet (such as a copper foil) to form the negative electrode.

The present invention also provides a cell, which comprises the above-mentioned negative electrode. For example, the cell may be a liquid lithium ion battery or a solid state lithium ion battery. Specifically, in embodiments of the liquid lithium ion battery, the liquid lithium ion battery comprises a positive electrode, a negative electrode, a separator and an electrolyte solution, wherein the separator is disposed between the positive electrode and the negative electrode, and the positive electrode and negative electrode are impregnated in the electrolyte solution. In embodiments of the solid state lithium ion battery, the solid state lithium ion battery comprises a positive electrode, a negative electrode and solid electrolyte, wherein the solid electrolyte is disposed between the positive electrode and the negative electrode.

As mentioned above, applying the negative electrode active material modified by zwitterionic polymer of the present invention in cells benefits lithium ion insertion and extraction, reduces irreversible reaction and prolongs cycle life of cells, thereby enhancing the overall effectiveness of lithium ion batteries.

The above-mentioned negative electrode active material can be further mixed with a conductive agent or an adhesive agent to obtain a negative electrode paste. The conductive agent may be conductive carbon black (Super P), conductive graphite (KS-6, KS-4), carbon nanotube (CNT), vapor grown carbon fiber (VGCF), but is not limited thereto. The adhesive agent may be polyvinylidene fluoride (PVDF), poly(acrylic acid) (PAA), styrene-butadiene rubber (SBR), carboxymethyl cellulose, polyacrylonitrile (PAN) or polyacrylate, but is not limited thereto.

The electrolyte solution may comprise an electrolyte, a solvent, and the like. The electrolyte may be a lithium salt such as lithium bis(fluorosulfonyl)imide (LiFSI), lithium bis(trifluoromethanesulfonyl)imide (LiTFSI), lithium hexafluorophosphate ($LiPF_6$), lithium tetrafluoroborate ($LiBF_4$), lithium perchlorate ($LiClO_4$), lithium trifluoromethanesulfonate (LiOTf), but is not limited thereto. The solvent may be dimethyl carbonate (DMC), ethylene carbonate (EC), propylene carbonate (PC), diethyl carbonate (DEC) or ethyl methyl carbonate (EMC), vinylene carbonate (VC), tetraethylene glycol dimethyl ether, but is not limited thereto.

The solid electrolyte may be lithium super ionic conductor (LISICON) type, Argyrodite type, Garnet type, Peroskite type, NASICON structure type, but is not limited thereto.

DETAILED DESCRIPTION OF THE PREFERRED EMBODIMENTS

Other objectives, advantages and novel features of the invention will become more apparent from the following detailed description when taken in conjunction with the accompanying drawings.

Negative Electrode Active Material Modified by Zwitterionic Polymer

Example 1

First, 5 grams (g) chitosan was added into 250 mL water at 25° C., then 11.74 g chloroacetic acid was added into the solution and stirred for 30 minutes to resolve chitosan. After that, the pH value of the solution was adjusted to pH 6 by lithium hydroxide aqueous solution, and reacted at 25° C. under atmospheric environment for 1 day; then the solution was placed in a dialysis bag with a molecular weight cut-off of about 6000 to 10000, and dialyzed with deionized water for 3 days; then 5.8 g lithium bis(fluorosulfonyl)imide (lithium bis(fluorosulfonyl)imide (LiFSI) was added, to obtain a zwitterionic polymer aqueous solution 1. The chemical equation is shown as below:

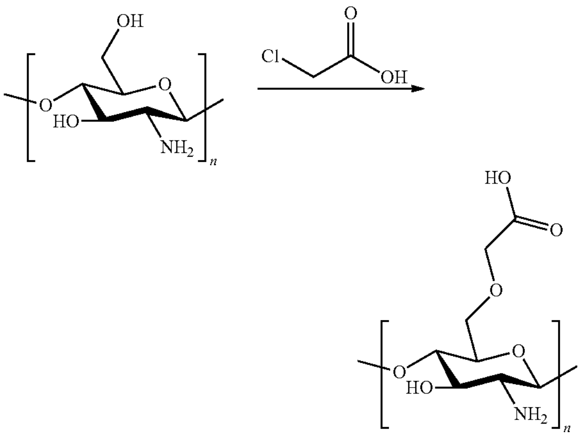

Figure 1A:
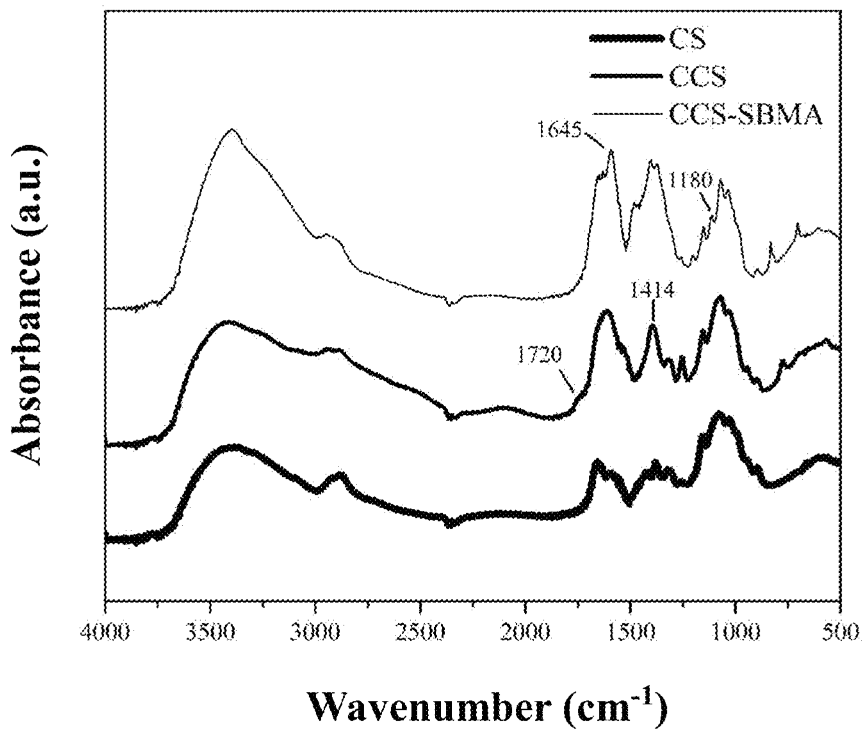
FIG. 1A is the FTIR spectrum of chitosan (CS), the zwitterionic polymer aqueous solution 1 of Example 1 (CCS) and the zwitterionic polymer aqueous solution 2 of Example 2 (CCS-SBMA).

Chitosan (CS) and the zwitterionic polymer aqueous solution 1 (CCS) were analyzed by Fourier transform infrared spectroscopy (FTIR). The result is shown in FIG. 1A. According to the comparison result of CS and CCS in FIG. 1A, it is clear that an absorption peak corresponding to $NH_2$ stretching vibration can be observed around 3500 $cm^{-1}$, an absorption peak corresponding to OH stretching vibration can be observed around 3430 $cm^{-1}$, an absorption peak corresponding to $NH_2$ bending vibration and an absorption peak corresponding to C—N stretching vibration can be observed around 1645 $cm^{-1}$, and an absorption peak corresponding to C—O stretching vibration can be observed around 1078 $cm^{-1}$. Besides, comparative with the FTIR spectrum of CS, an absorption peak corresponding to C═O stretching vibration can be observed around 1720 $cm^{-1}$, and an absorption peak corresponding to COO-stretching vibration can be observed around 1414 $cm^{-1}$ in CCS. This proves that the experiment has successfully carboxylated the hydroxyl groups on chitosan, and the zwitterionic polymer aqueous solution 1 comprising O-carboxymethyl chitosan has been synthesized. The O-carboxymethyl chitosan simultaneously has —$NH_2$ as a positive ion group, and a carboxylate group as a negative ion group.

After that, lithium titanate (LTO) powder (purchased from CPC Corporation, Taiwan: having a D50 of about 8 μm) was used as the negative electrode active substance. 100 g LTO powder was slowly added into 135 g the zwitterionic polymer aqueous solution 1 (the amount of the zwitterionic polymer in the zwitterionic polymer aqueous solution 1 was about 0.75 wt %, which meant that the weight ratio of the zwitterionic polymer:LTO powder was about 1:100), and the zwitterionic polymer aqueous solution 1 was continuously stirred at a rotation speed of 1500 rpm. After that, 0.005 g of 25% glutaraldehyde (used as a cross-linking agent) was added, and the temperature was increased to 80° C. with continuous stirring for crosslinking reaction for 1 day, and then the resulting product was died and grounded to obtain a negative electrode active material modified by zwitterionic polymer in powder form.

The negative electrode active material modified by zwitterionic polymer comprised a LTO powder and a nano-scaled layer of zwitterionic polymer, the nano-scaled layer of zwitterionic polymer coated the LTO powder, and the weight percentage of the nano-scaled layer of zwitterionic polymer relative to the LTO powder was 1 wt %.

Figure 2A:
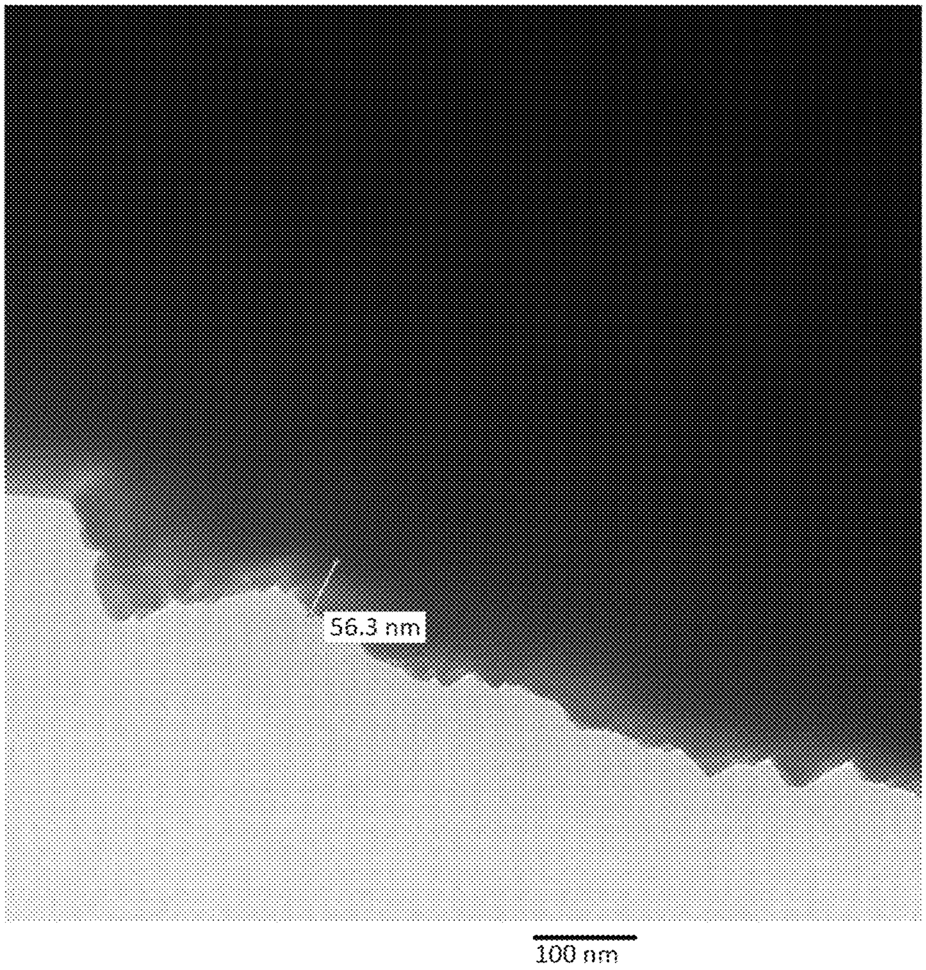
FIG. 2A is a TEM image of the negative electrode active material modified by zwitterionic polymer of Example 1.
Figure 3A:
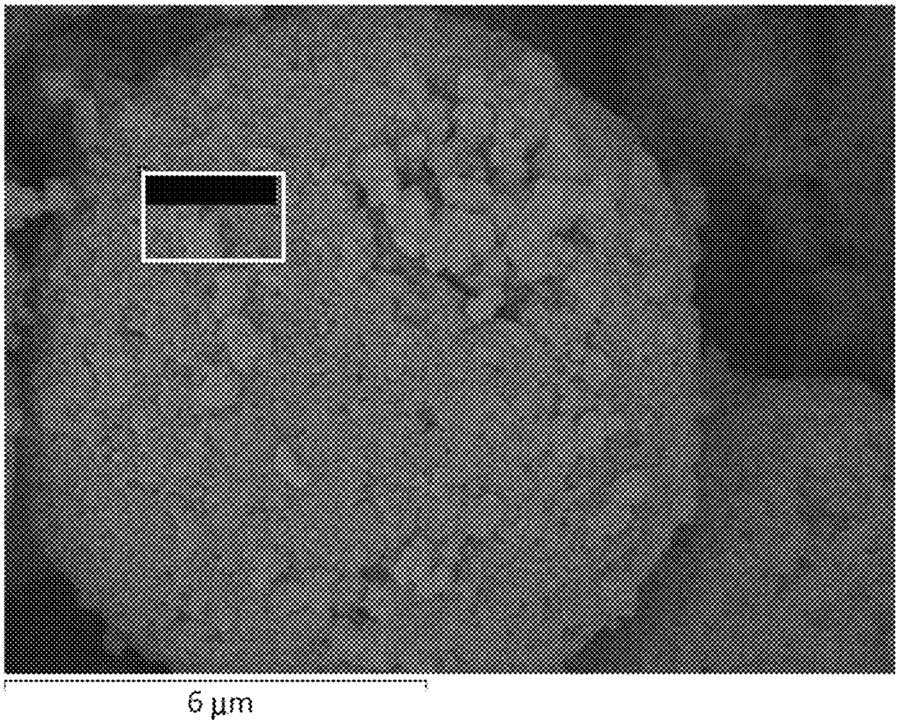
FIG. 3A is a SEM image of the negative electrode active material modified by zwitterionic polymer of Example 1.

The negative electrode active material modified by zwitterionic polymer was observed by a transmission electron microscope (TEM). The result is shown in FIG. 2A. The thickness of the nano-scaled layer of zwitterionic polymer was about 56.3 nm. Besides, in this experiment, the zwitterionic polymer-modified negative electrode active material was also observed by scanning electron microscope (SEM). The result is shown in FIG. 3A. In this experiment, the area framed by the square shown in FIG. 3A was subjected to elemental analysis by energy dispersive X-ray spectroscopy (EDS), and it was found that the area had about 4.49 wt % of carbon, 59.72 wt % of oxygen and 35.79 wt % of titanium. From above, it was confirmed that a polymer-modified negative electrode active material was obtained.

Example 2

First, 5 g O-carboxymethyl chitosan (CCS) was added into and dissolved in 250 mL water at 25° C., then 7.5 g sulfobetaine methacrylate (SBMA) was added into the solution, then the pH value of the solution was adjusted to pH 14 by 10 g lithium hydroxide aqueous solution, and reacted at 50° C. under atmospheric environment for 1 day; then the solution was placed in a dialysis bag with a molecular weight cut-off of about 6000 to 10000, and dialyzed with deionized water for 3 days; then 1.67 g LiFSI was added and stirred to dissolve, and to obtain a zwitterionic polymer aqueous solution 2. The chemical equation is shown as below:

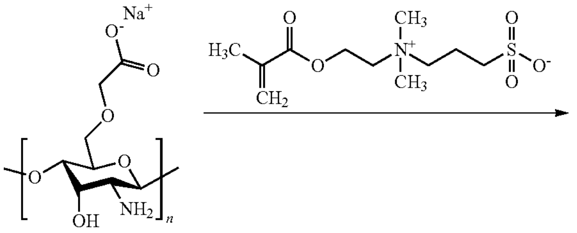

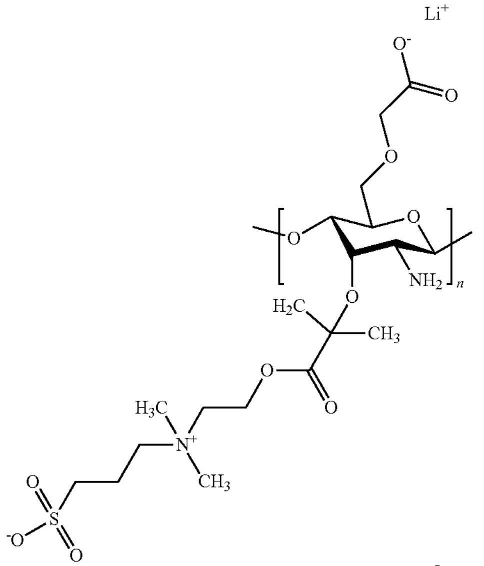

or

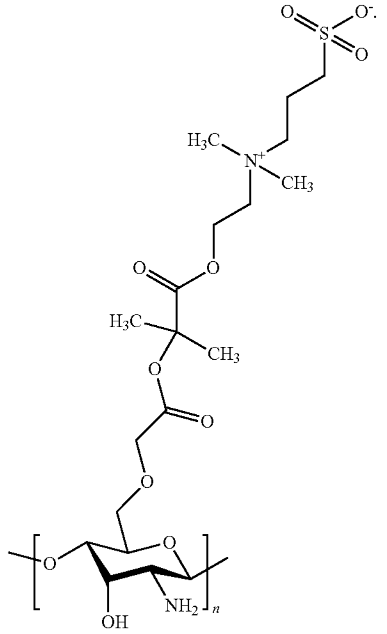

The zwitterionic polymer aqueous solution 2 (CCS-SBMA) was analyzed by FTIR. The result is shown in FIG. 1A. According to the comparison result of CCS and CCS- SBMA in FIG. 1A, it is clear that an absorption peak corresponding to $NH_2$ stretching vibration can be observed around 3500 $cm^{-1}$, an absorption peak corresponding to OH stretching vibration can be observed around 3430 $cm^{-1}$, an absorption peak corresponding to $NH_2$ bending vibration and an absorption peak corresponding to C—N stretching vibration can be observed around 1645 $cm^{-1}$, an absorption peak corresponding to C═O stretching vibration can be observed around 1720 $cm^{-1}$, an absorption peak corresponding to $COO^-$ asymmetric stretching vibration can be observed around 1414 $cm^{-1}$, and an absorption peak corresponding to C—O stretching vibration can be observed around 1078 $cm^{-1}$. Besides, comparative with the FTIR spectrum of CCS, an absorption peak corresponding to $SO_3^-$ stretching vibration can be observed around 1180 $cm^{-1}$ in CCS-SBMA. This proves that the SBMA molecule has successfully linked to the skeleton of CCS, and the zwitterionic polymer aqueous solution 2 comprising a SBMA-modified O-carboxymethyl chitosan has been synthesized.

After that, LTO powder (purchased from CPC Corporation, Taiwan; having a D50 of about 8 μm) was used as the negative electrode active substance. 100 g LTO powder was added into 135 g the zwitterionic polymer aqueous solution 2 (the amount of the zwitterionic polymer in the zwitterionic polymer aqueous solution 2 was about 0.75%, which meant that the weight ratio of the zwitterionic polymer:LTO powder was about 1:100), and the zwitterionic polymer aqueous solution 2 was continuously stirred at a rotation speed of 1500 rpm. After that, 0.005 g of 25% glutaraldehyde was added, and the temperature was increased to 80° C. with continuous stirring for crosslinking reaction for 1 day, and then the resulting product was dried and grounded to obtain a negative electrode active material modified by zwitterionic polymer in powder form.

The negative electrode active material modified by zwitterionic polymer comprised a LTO powder and a nano-scaled layer of zwitterionic polymer, the nano-scaled layer of zwitterionic polymer coated the LTO powder, and the weight percentage of the nano-scaled layer of zwitterionic polymer relative to the LTO powder was 1 wt %.

Figure 2B:
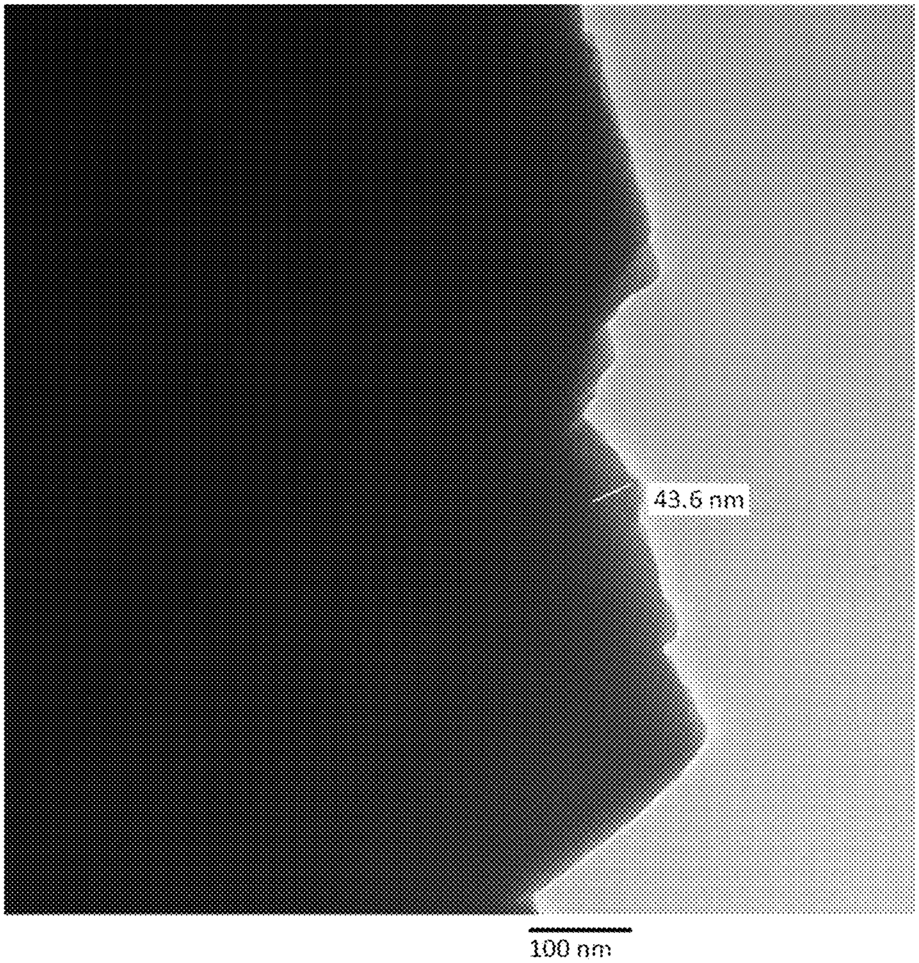
FIG. 2B is a TEM image of the negative electrode active material modified by zwitterionic polymer of Example 2.
Figure 3B:
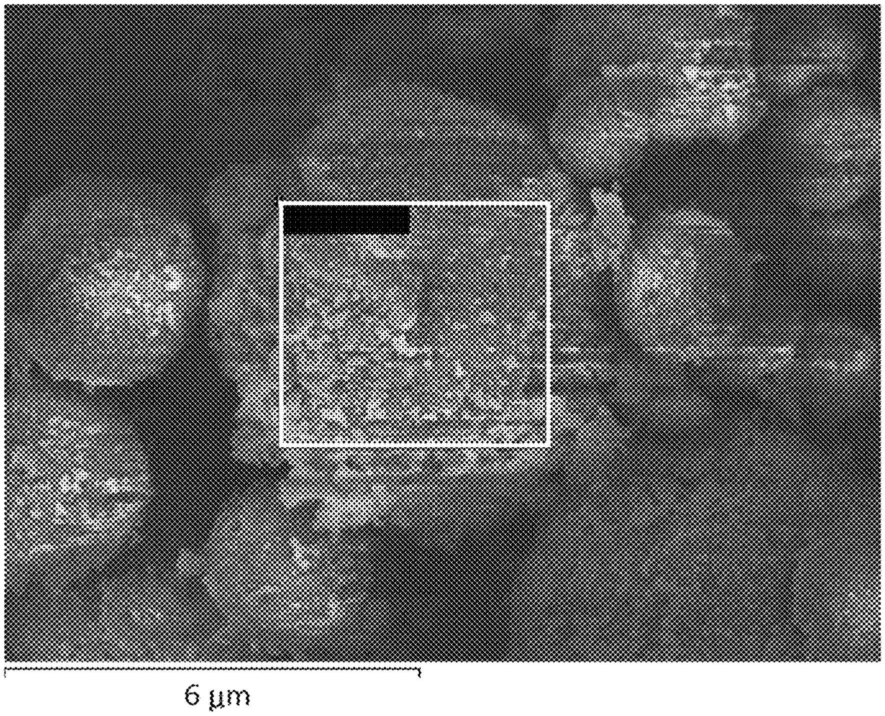
FIG. 3B is a SEM image of the negative electrode active material modified by zwitterionic polymer of Example 2.

The negative electrode active material modified by zwitterionic polymer was observed by TEM. The result is shown in FIG. 2B. The thickness of the nano-scaled layer of zwitterionic polymer was about 43.6 nm. Besides, the zwitterionic polymer-modified negative electrode active material was also observed by SEM. The result is shown in FIG. 3B. In this experiment, the area framed by the square shown in FIG. 3B was subjected to elemental analysis by EDS, and it was found that the area had about 2.89 wt % of carbon, 48.84 wt % of oxygen, 0.16 wt % of sulfur and 48.11 wt % of titanium. From above, it was confirmed that a polymer-modified negative electrode active material was obtained.

Example 3

First, 5 g carboxymethyl cellulose (CMC) was added into and resolved in 250 mL water at 25° C., then 2.5 g SBMA was added into the solution, then the pH value of the solution was adjusted to pH 9 by lithium hydroxide aqueous solution, and reacted at 50° C. under atmospheric environment for 1 day; then the solution was placed in a dialysis bag with a molecular weight cut-off of about 6000 to 10000, and dialyzed with deionized water for 3 days; then 1.67 g LiFSI was added and stirred to dissolve, to obtain a zwitterionic polymer aqueous solution 3. The chemical equation is shown as below:

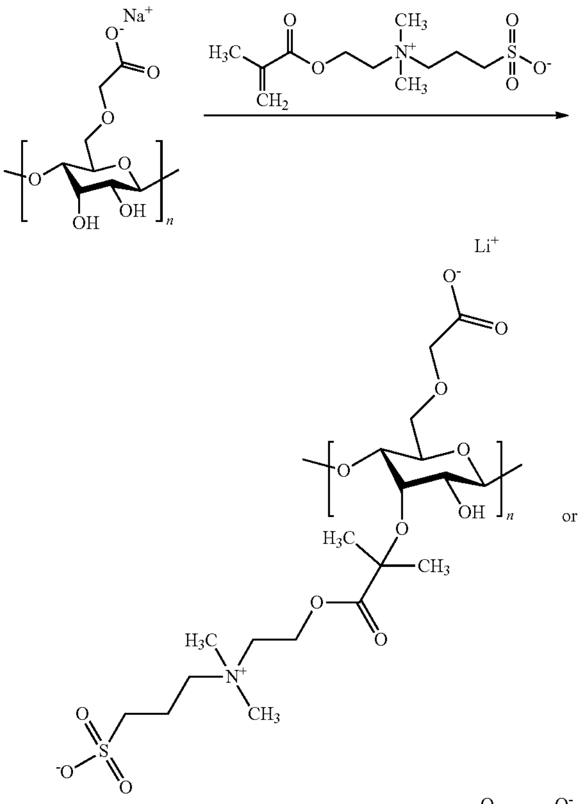

or

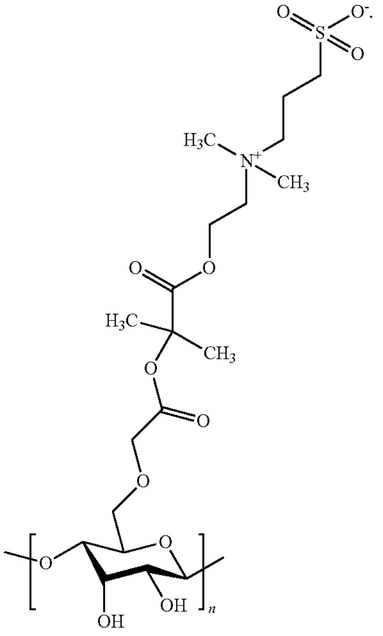

Figure 1B:
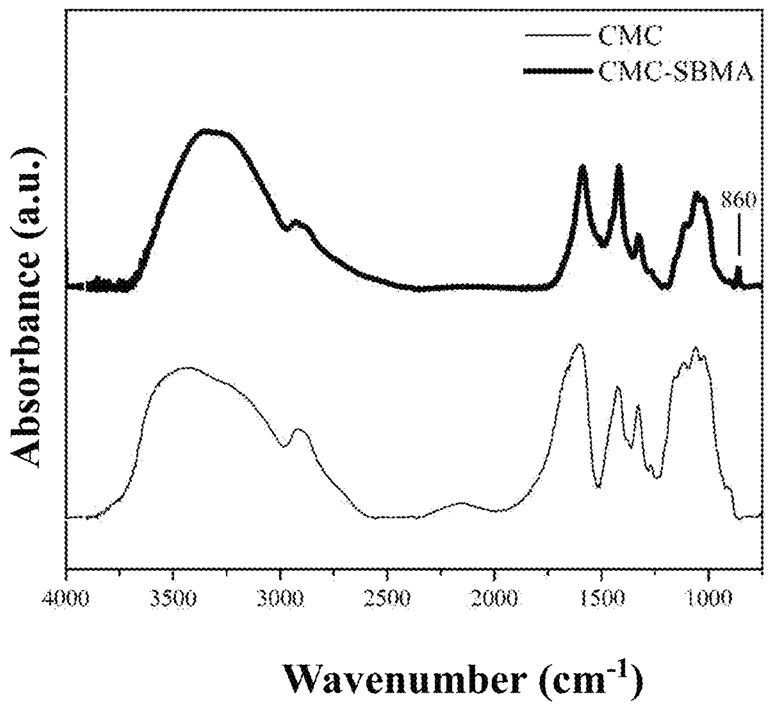
FIG. 1B is the FTIR spectrum of carboxymethyl cellulose (CMC) and the zwitterionic polymer aqueous solution 3 of Example 3 (CMC-SBMA).

CMC and the zwitterionic polymer aqueous solution 3 (CMC-SBMA) were analyzed by FTIR. The result is shown in FIG. 1B. According to the comparison result of CMC and CMC-SBMA in FIG. 1B, it is clear that an absorption peak corresponding to OH stretching vibration can be observed around 3300 $cm^{-1}$ to 3600 $cm^{1}$, an absorption peak corresponding to CH stretching vibration can be observed around 2916 $cm^{-1}$, and an absorption peak corresponding to $COO^-$ stretching vibration can be observed around 1420 $cm^{-1}$ and 1330 $cm^{-1}$. Besides, comparative with the FTIR spectrum of CMC, an absorption peak corresponding to $SO_3^-$ stretching vibration can be observed around 860 $cm^{-1}$ in CMC-SBMA. This proves that the SBMA molecule has successfully linked to the skeleton of CMC, and the zwitterionic polymer aqueous solution 3 comprising a SBMA-modified carboxymethyl cellulose has been synthesized.

After that, LTO powder (purchased from CPC Corporation, Taiwan; having a D50 of about 8 μm) was used as the negative electrode active substance. 100 g LTO powder was added into 135 g the zwitterionic polymer aqueous solution 3 (the amount of the zwitterionic polymer in the zwitterionic polymer aqueous solution 3 was about 0.75%, which meant that the weight ratio of the zwitterionic polymer:LTO powder was about 1:100), and the zwitterionic polymer aqueous solution 3 was continuously stirred at a rotation speed of 1500 rpm. After that, 0.005 g of 25% glutaraldehyde was added, and the temperature was increased to 80° C. with continuous stirring for crosslinking reaction for 1 day, and then the resulting product was dried and grounded to obtain a negative electrode active material modified by zwitterionic polymer in powder form.

The negative electrode active material modified by zwitterionic polymer comprised a LTO powder and a nano-scaled layer of zwitterionic polymer, the nano-scaled layer of zwitterionic polymer coated the LTO powder, and the weight percentage of the nano-scaled layer of zwitterionic polymer relative to the LTO powder was 1 wt %.

Figure 2C:
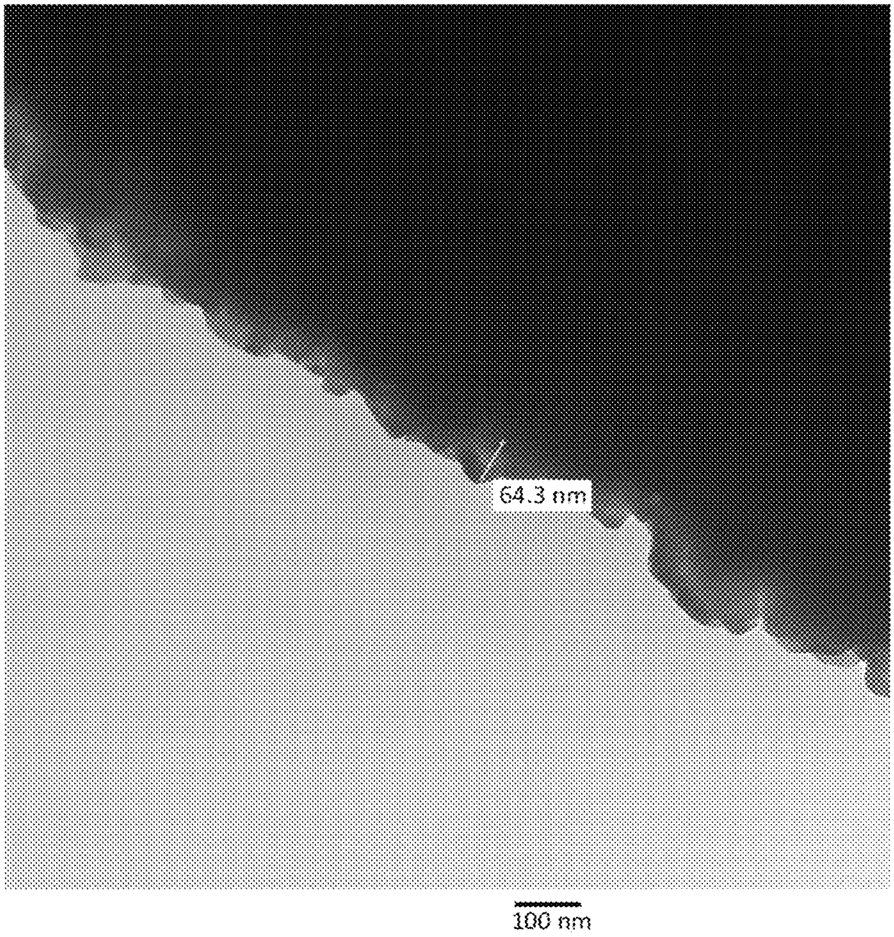
FIG. 2C is a TEM image of the negative electrode active material modified by zwitterionic polymer of Example 3.
Figure 3C:
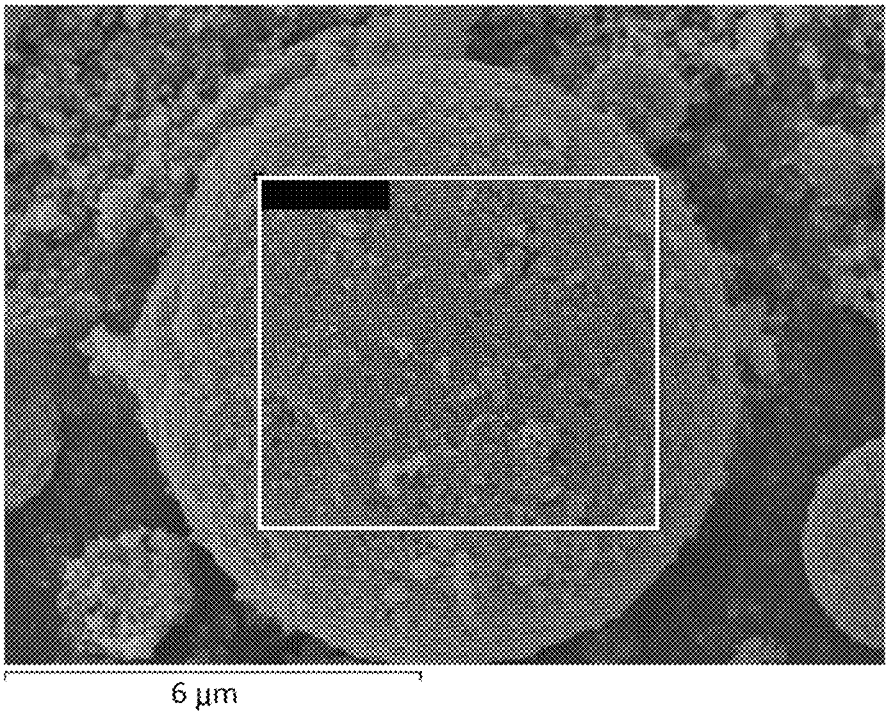
FIG. 3C is a SEM image of the negative electrode active material modified by zwitterionic polymer of Example 3.

The negative electrode active material modified by zwitterionic polymer was observed by TEM. The result is shown in FIG. 2C. The thickness of the nano-scaled layer of zwitterionic polymer was about 64.3 nm. Besides, the zwitterionic polymer-modified negative electrode active material was also observed by SEM. The result is shown in FIG. 3C. In this experiment, the area framed by the square shown in FIG. 3C was subjected to elemental analysis by EDS, and it was found that the area had about 4.89 wt % of carbon, 53.50 wt % of oxygen, 0.59 wt % of sulfur and 41.02 wt % of titanium. From above, it was confirmed that a polymer-modified negative electrode active material was obtained.

Example 4

In this Example, the method of Example 2 was used to prepare the zwitterionic polymer aqueous solution 2 (CCS-SBMA). After that, mesophase graphite powder (purchased from China Steel Chemical Corporation, named as MG11, having a D50 of about 11 μm) was used as the negative electrode active substance, 100 g MG11 powder was added into 135 g the zwitterionic polymer aqueous solution 2 (the amount of the zwitterionic polymer in the zwitterionic polymer aqueous solution 2 was about 0.75%, which meant that the weight ratio of the zwitterionic polymer:MG11 powder was about 1:100), and the zwitterionic polymer aqueous solution 2 was continuously stirred at a rotation speed of 2500 rpm for 30 minutes. After that, 0.005 g of 25% glutaraldehyde was added, and the temperature was increased to 80° C. with continuous stirring for crosslinking reaction for 1 day, and then the resulting product was dried and grounded to obtain a negative electrode active material modified by zwitterionic polymer in powder form.

The negative electrode active material modified by zwitterionic polymer comprised a MG11 powder and a nano-scaled layer of zwitterionic polymer, the nano-scaled layer of zwitterionic polymer coated the MG11 powder, and the weight percentage of the nano-scaled layer of zwitterionic polymer relative to the MG11 powder was 1 wt %.

Figure 2D:
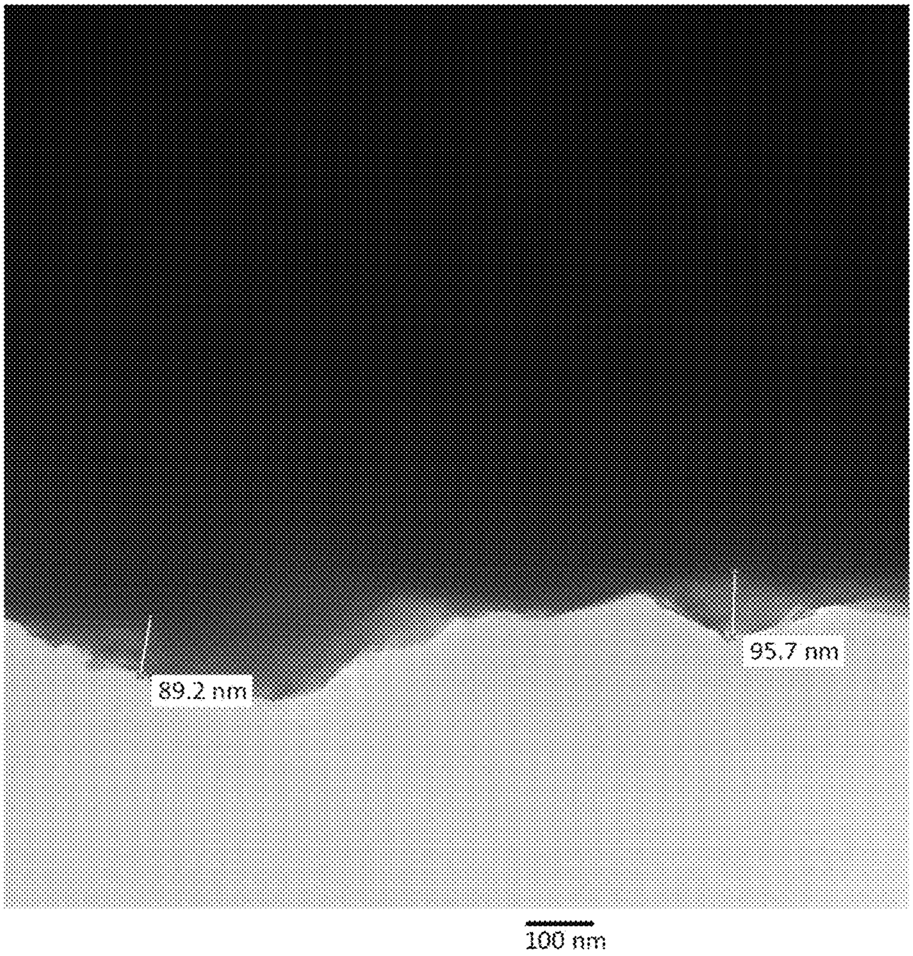
FIG. 2D is a TEM image of the negative electrode active material modified by zwitterionic polymer of Example 4.
Figure 3D:
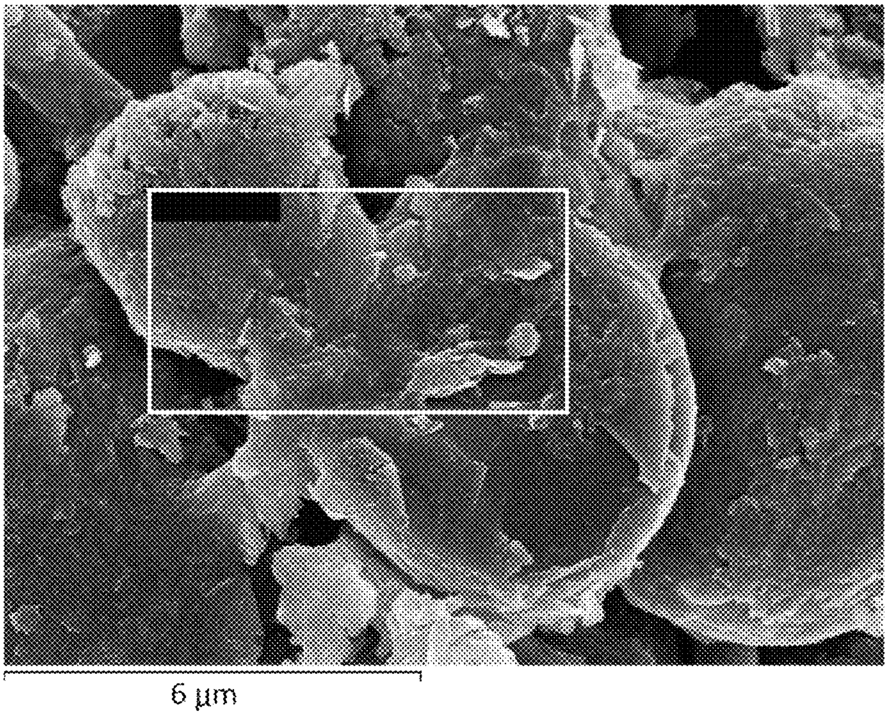
FIG. 3D is a SEM image of the negative electrode active material modified by zwitterionic polymer of Example 4.

The negative electrode active material modified by zwitterionic polymer was observed by TEM. The result is shown in FIG. 2D. The thickness of the nano-scaled layer of zwitterionic polymer was about 89.2 nm or 95.7 nm. Besides, the zwitterionic polymer-modified negative electrode active material was also observed by SEM. The result is shown in FIG. 3D. In this experiment, the area framed by the square shown in FIG. 3D was subjected to elemental analysis by EDS, and it was found that the area had about 92.69 wt % of carbon, 2.28 wt % of nitrogen, 4.75 wt % of oxygen and 0.29 wt % of sulfur. From above, it was confirmed that a polymer-modified negative electrode active material was obtained.

Example 5

In this Example, the method of Example 1 was used to prepare the zwitterionic polymer aqueous solution 1 (CCS). After that, nano silicon powder (having a D50 of about 100 nm) was used as the negative electrode active substance, 100 g nano silicon powder was added into 135 g the zwitterionic polymer aqueous solution 1 (the amount of the zwitterionic polymer in the zwitterionic polymer aqueous solution 1 was about 0.75 wt %, which meant that the weight ratio of the zwitterionic polymer:nano silicon powder was about 1:100), and the zwitterionic polymer aqueous solution 1 was continuously stirred at a rotation speed of 2000 rpm. After that, 0.005 g of 25% glutaraldehyde was added, and the temperature was increased to 80° C. with continuous stirring for crosslinking reaction for 1 day, and then the resulting product was dried and grounded to obtain a negative electrode active material modified by zwitterionic polymer in powder form.

The negative electrode active material modified by zwitterionic polymer comprised a nano silicon powder and a nano-scaled layer of zwitterionic polymer, the nano-scaled layer of zwitterionic polymer coated the nano silicon powder, and the weight percentage of the nano-scaled layer of zwitterionic polymer relative to the nano silicon powder was 1 wt %.

Figure 3E:
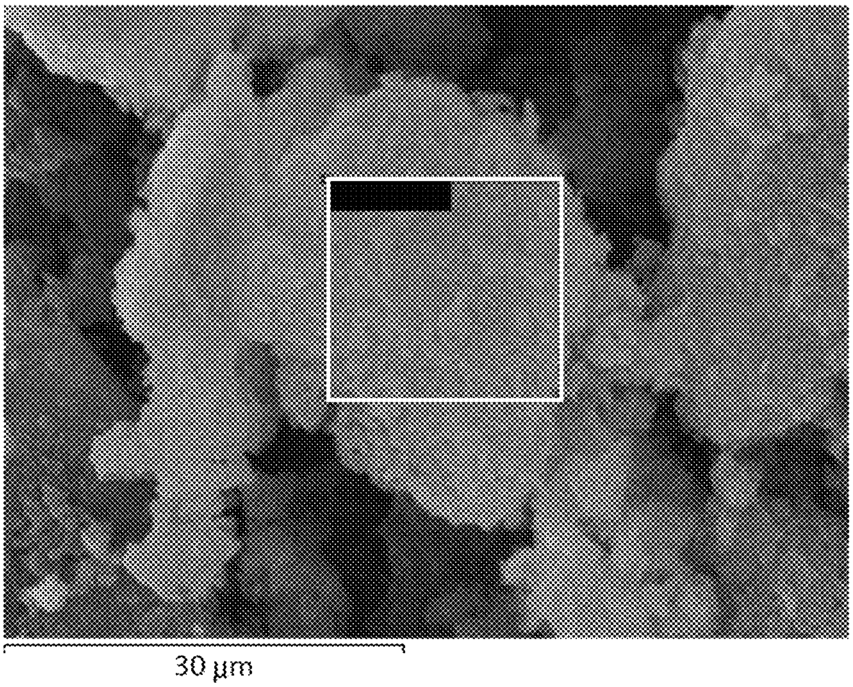
FIG. 3E is a SEM image of the negative electrode active material modified by zwitterionic polymer of Example 5.

The zwitterionic polymer-modified negative electrode active material was also observed by SEM. The result is shown in FIG. 3E. In this experiment, the area framed by the square shown in FIG. 3E was subjected to elemental analysis by EDS, and it was found that the area had about 34.49 wt % of carbon, 19.59 wt % of oxygen and 45.91 wt % of silicon. From above, it was confirmed that a polymer-modified negative electrode active material was obtained. The thickness of the nano-scaled layer of zwitterionic polymer was about 10 nm.

Example 6

In this Example, the method of Example 1 was used to prepare the zwitterionic polymer aqueous solution 1 (CCS). After that, mesophase graphite powder (MG11, having a D50 of about 11 un) was used as the negative electrode active substance. 100 g MG11 powder was added into 135 g the zwitterionic polymer aqueous solution 1 (the amount of the zwitterionic polymer in the zwitterionic polymer aqueous solution 1 was about 0.75%, which meant that the weight ratio of the zwitterionic polymer:MG11 powder was about 1:100), and the zwitterionic polymer aqueous solution 1 was continuously stirred at a rotation speed of 2500 rpm for 30 minutes. After that, 0.005 g of 25% glutaraldehyde was added, and the temperature was increased to 80° C. with continuous stirring for crosslinking reaction for 1 day, and then the resulting product was dried and grounded to obtain a negative electrode active material modified by zwitterionic polymer in powder form.

The negative electrode active material modified by zwitterionic polymer comprised a MG11 powder and a nano-scaled layer of zwitterionic polymer, the nano-scaled layer of zwitterionic polymer coated the MG11 powder, and the weight percentage of the nano-scaled layer of zwitterionic polymer relative to the MG11 powder was 1 wt %.

Figure 2E:
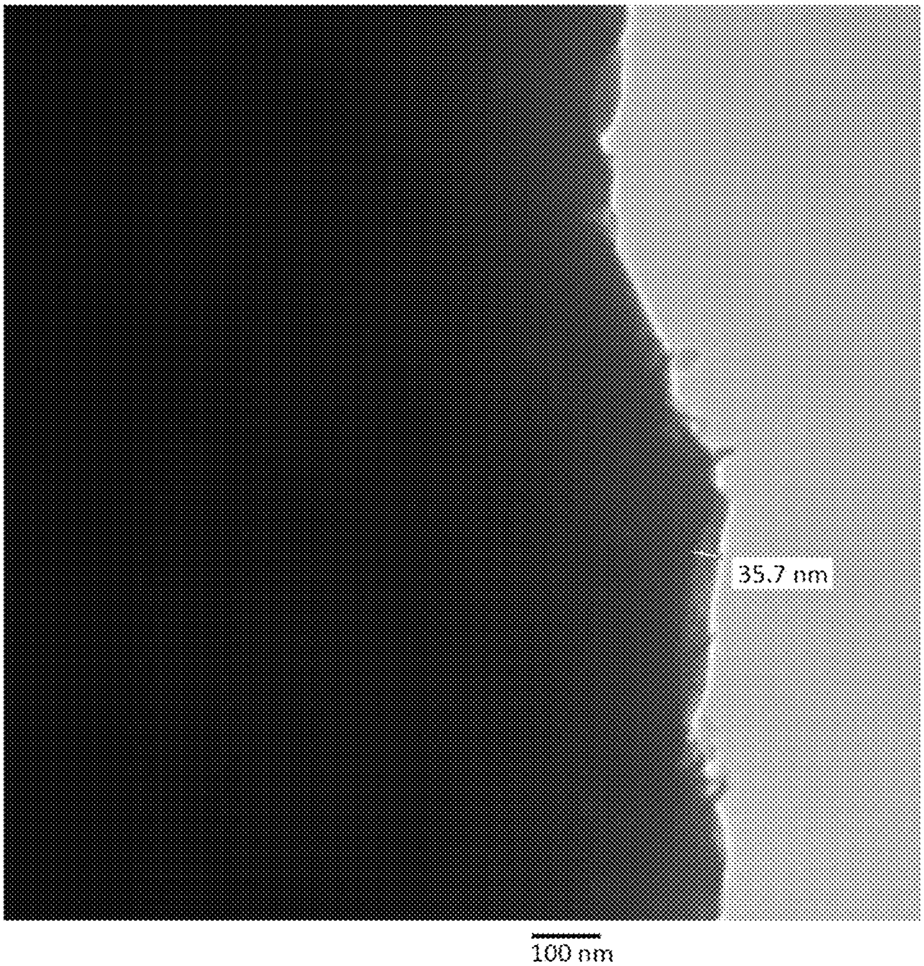
FIG. 2E is a TEM image of the negative electrode active material modified by zwitterionic polymer of Example 6.
Figure 3F:
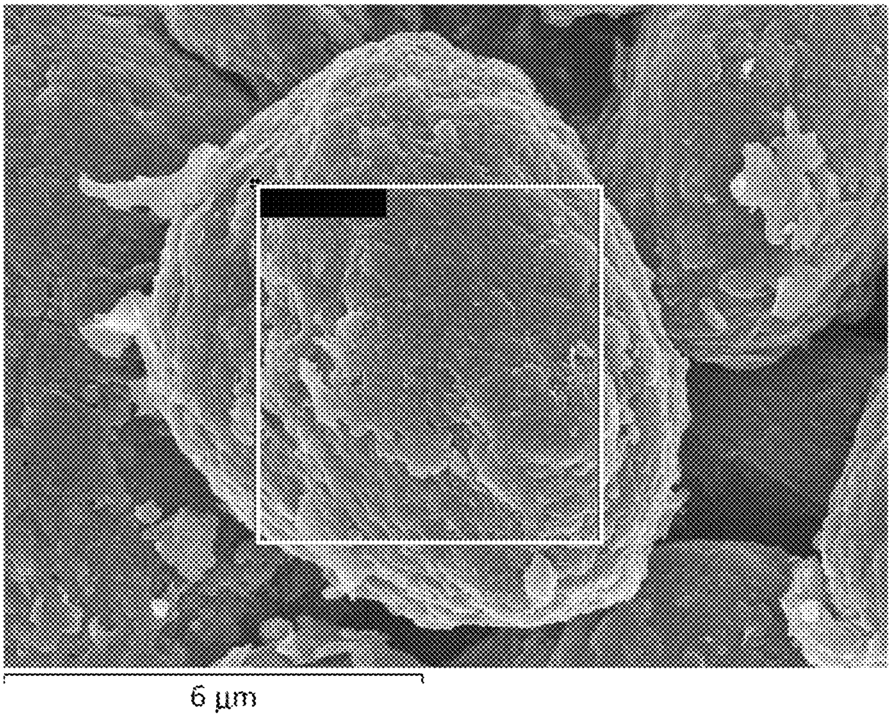
FIG. 3F is a SEM image of the negative electrode active material modified by zwitterionic polymer of Example 6.

The negative electrode active material modified by zwitterionic polymer was observed by TEM. The result is shown in FIG. 2E. The thickness of the nano-scaled layer of zwitterionic polymer was about 35.7 nm. Besides, the zwitterionic polymer-modified negative electrode active material was also observed by SEM. The result is shown in FIG. 3F. In this experiment, the area framed by the square shown in FIG. 3F was subjected to elemental analysis by EDS, and it was found that the area had 94.96 wt % of carbon, 1.97 wt % of nitrogen and 3.07 wt % of oxygen. From above, it was confirmed that a polymer-modified negative electrode active material was obtained.

Example 7

In this Example, the method of Example 3 was used to prepare the zwitterionic polymer aqueous solution 3 (CMC-SBMA). After that, mesophase graphite powder (MG11, having a D50 of about 11 μM) was used as the negative electrode active substance. 100 g MG11 powder was added into 135 g the zwitterionic polymer aqueous solution 3 (the amount of the zwitterionic polymer in the zwitterionic polymer aqueous solution 3 about 0.75%, which meant that the weight ratio of the zwitterionic polymer:MG11 powder was about 1:100), and the zwitterionic polymer aqueous solution 3 was continuously stirred at a rotation speed of 2500 rpm for 30 minutes. After that, 0.005 g of 25% glutaraldehyde was added, and the temperature was increased to 80° C. with continuous stirring for crosslinking reaction for 1 day, and then the resulting product was dried and grounded to obtain a negative electrode active material modified by zwitterionic polymer in powder form.

The negative electrode active material modified by zwitterionic polymer comprised a MG11 powder and a nano-scaled layer of zwitterionic polymer, the nano-scaled layer of zwitterionic polymer coated the MG11 powder, and the weight percentage of the nano-scaled layer of zwitterionic polymer relative to the MG11 powder was 1 wt %.

Figure 2F:
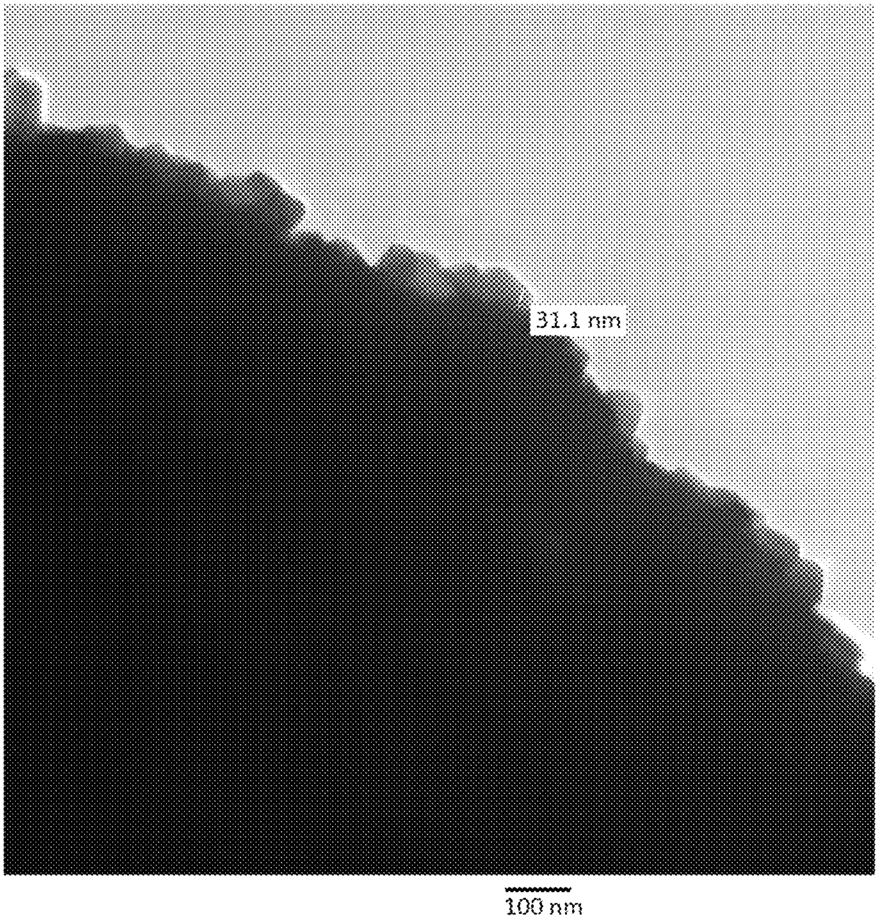
FIG. 2F is a TEM image of the negative electrode active material modified by zwitterionic polymer of Example 7.
Figure 3G:
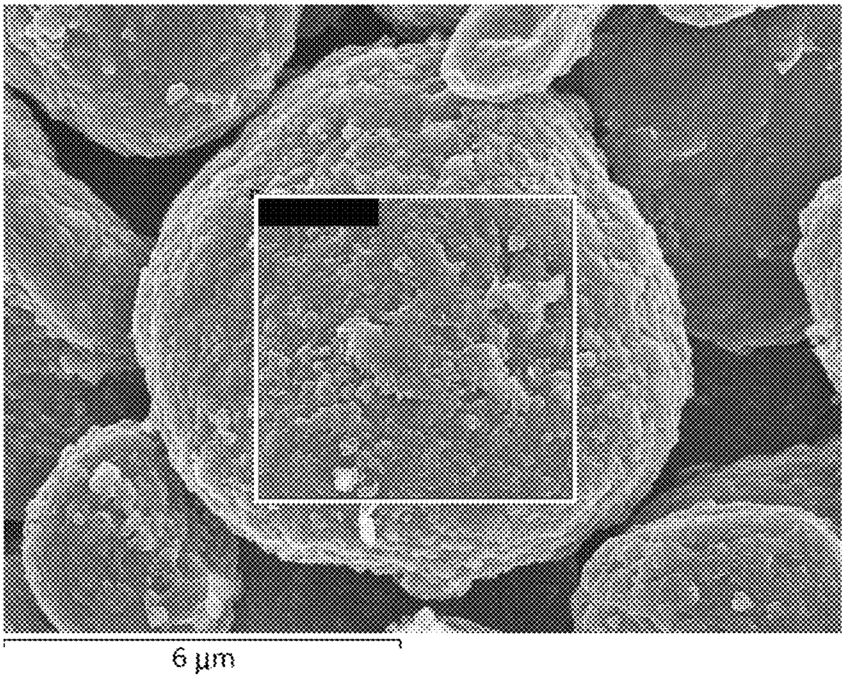
FIG. 3G is a SEM image of the negative electrode active material modified by zwitterionic polymer of Example 7.
Figure 4:
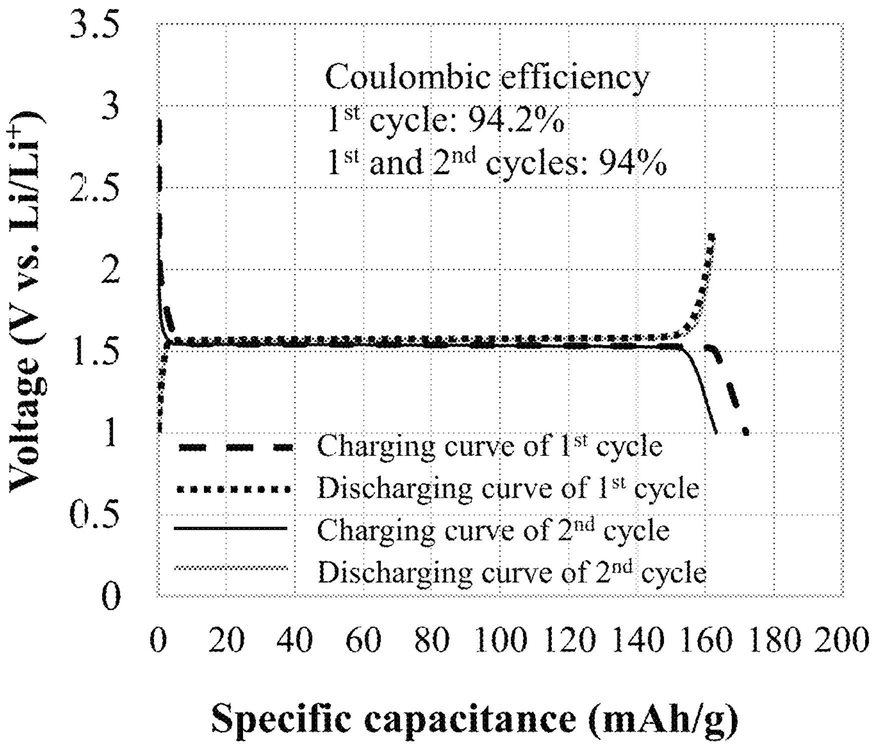
FIG. 4 is the voltage-specific capacitance diagram of the cell of Comparative Example 1A during the first two charging and discharging cycles.

The negative electrode active material modified by zwitterionic polymer was observed by TEM. The result is shown in FIG. 2F. The thickness of the nano-scaled layer of zwitterionic polymer was about 31.1 nm. Besides, the zwitterionic polymer-modified negative electrode active material was also observed by SEM. The result is shown in FIG. 3G. In this experiment, the area framed by the square shown in FIG. 3G was subjected to elemental analysis by EDS, and it was found that the area had 95.40 wt % of carbon, 3.03 wt % of nitrogen, 1.30 wt % of oxygen and 0.26 wt % of sulfur. From above, it was confirmed that a polymer-modified negative electrode active material was obtained.

Applications of Negative Electrode Active Material Modified by Zwitterionic Polymer

Comparative Example 1A

In this Comparative Example, LTO powder that was not modified by zwitterionic polymer (purchased from CPC Corporation, Taiwan; having a D50 of about 8 μm) was used as the negative electrode active material. The LTO powder used in this Comparative Example and the negative electrode active substance (LTO powder) used in Examples 1 to 3 were the same. With a weight ratio of the negative electrode active material:Super P (purchased from IMERYS):KS-6 (purchased from IMERYS):PVDF (purchased from Solef)=85:2.5:4:8.5, all components were homogeneously mixed in N-methylpyrrolidinone (NMP) to prepare a negative electrode paste. Next, the negative electrode paste was coated on a copper foil and dried, and the copper foil coated by the negative electrode paste was rolled by an external force of 1 ton/centimeter (ton/cm), then the electrode sheet was placed in a vacuum oven at 80° C. under vacuum overnight, to obtain a negative electrode.

An appropriate amount of $LiPF_6$ was dissolved in DMC and EC with a volume ratio of 1:1 to prepare 1 molarity (M) $LiPF_6$/DMC/EC electrolyte solution (also can be purchased from Formosa Plastics Corporation). With lithium metal used as the counter electrode and a polypropylene membrane (having a thickness of about 20 μm, purchased from Foresight Energy Technologies Co., Ltd.) used as the separator, 2 drops (about 125 μL) of 1 M $LiPF_6$/DMC/EC electrolyte solution were dropped in and the whole system stood still for 12 hours to produce a button cell.

Examples 1A to 3A

For Examples 1A to 3A, a method similar to the method of Comparative Example 1A was used to produce the negative electrode and the button cell, with the only difference of the choice of the negative electrode active material. Specifically, the negative electrode active material modified by zwitterionic polymer prepared in Example 1 was used in Example 1A, the negative electrode active material modified by zwitterionic polymer prepared in Example 2 was used in Example 2A, and the negative electrode active material modified by zwitterionic polymer prepared in Example 3 was used in Example 3A.

The button cells of Comparative Example 1A and Examples 1A to 3A were subjected to analysis, and a cycling test was carried out at a charging/discharging rate of 0.1 C at a voltage interval between 1.0 V and 2.2 V. The expression of the first two cycles during the charging and discharging cycle test is shown in FIG. 4 to FIG. 7. The coulombic efficiency is listed in the following Table 1.

Figure 5:
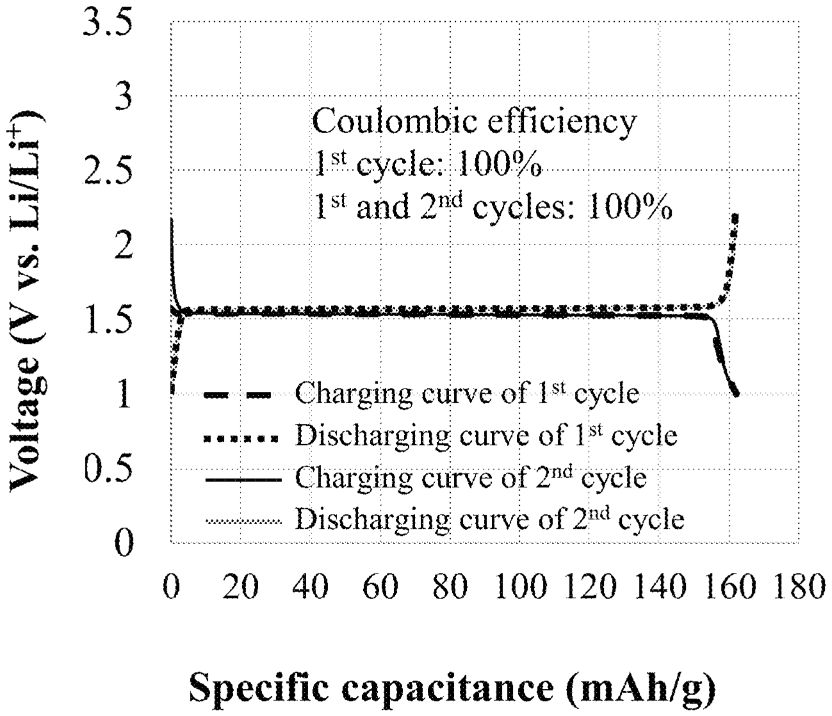
FIG. 5 is the voltage-specific capacitance diagram of the cell of Example 1A during the first two charging and discharging cycles.
Figure 6:
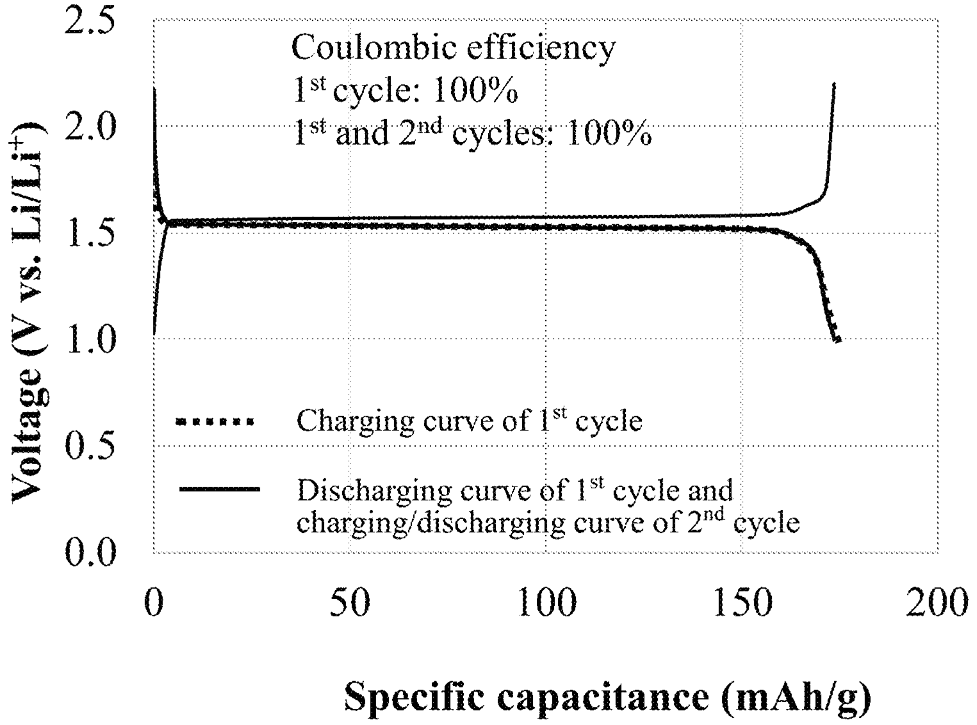
FIG. 6 is the voltage-specific capacitance diagram of the cell of Example 2A during the first two charging and discharging cycles.
Figure 7:
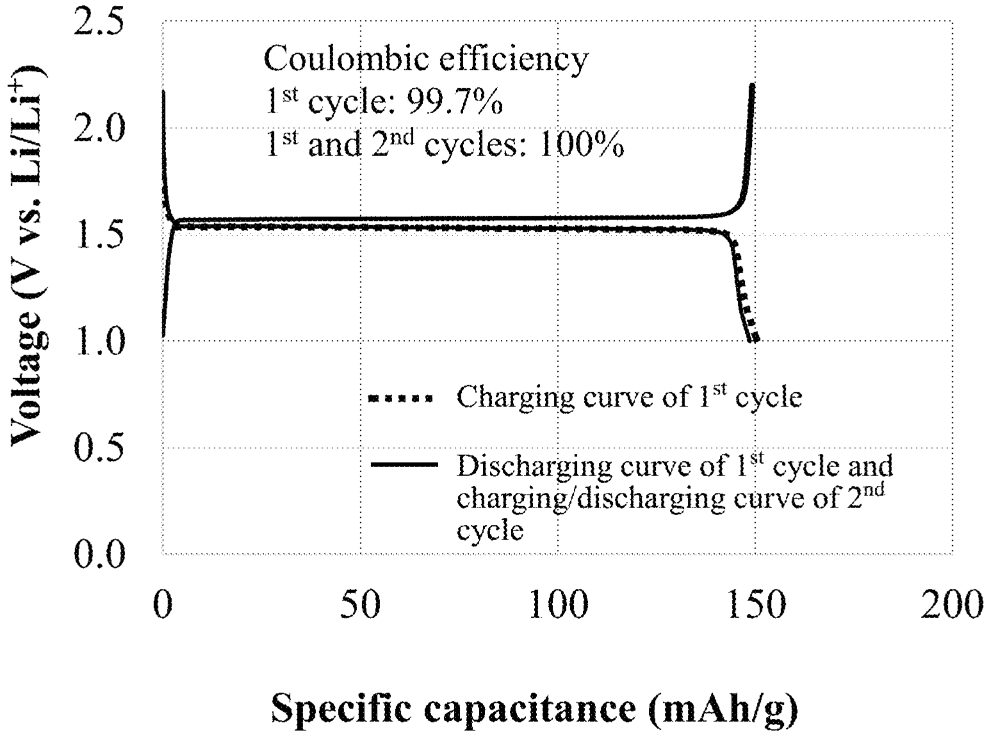
FIG. 7 is the voltage-specific capacitance diagram of the cell of Example 3A during the first two charging and discharging cycles.

From FIGS. 5 to 7, it is clear that the cells of Examples 1A to 3A comprise the nano-scaled layer of zwitterionic polymer modified LTO powder as the negative electrode active material, so the initial lithium insertion reaction is quite consistent with the insertion reactions in the following charging and discharging process, and no obvious irreversible reaction occurs. Besides, as shown in Table 1, comparative with Comparative Example 1A, the coulombic efficiency of Examples 1A to 3A in the first cycle, and in the first and the second cycles is obviously higher than the coulombic efficiency of Comparative Example 1A.

TABLE 1

Coulombic efficiency of the cells of Examples 1A to 3A and Comparative Example 1A at the first ($1^{st}$) cycle, and at the first ($1^{st}$) cycle and second ($2^{nd}$) cycles.

| Coulombic efficiency | Example 1A | Example 2A | Example 3A | Comparative Example 1A |
|---|---|---|---|---|
| $1^{st}$ cycle | 100% | 100% | 99.7% | 94.2% |
| $1^{st}$ and $2^{nd}$ cycles | 100% | 100% | 100% | 94% |

Comparative Example 2A

In this Comparative Example, MG11 powder that was not modified by zwitterionic polymer (having a D50 of about 11 μm) was used as the negative electrode active material. The MG11 powder used in this Comparative Example and the negative electrode active substance used in Example 4 (MG11 powder) were the same, With a weight ratio of the negative electrode active material:Super P:KS-6: PVDF=93.5:1:1:4.5, all components were homogeneously mixed in NMP (as a solvent) to prepare a negative electrode paste. Next, the negative electrode paste was coated on a copper foil and dried, and the copper foil coated by the negative electrode paste was rolled by an external force of 1 ton/cm, then the electrode sheet was placed in a vacuum oven at 80° C. (under vacuum overnight, to obtain a negative electrode.

With lithium metal used as the counter electrode and a polypropylene membrane used as the separator (having a thickness of about 20 μm, purchased from Foresight Energy Technologies Co., Ltd.), 2 drops (about 125 μL) of 1 M $LiPF_6$/DMC/EC electrolyte solution (purchased from Formosa Plastics Corporation) were dropped in and the whole system stood still for 12 hours to produce a button cell.

Example 4A

For Example 4A, a method similar to the method of Comparative Example 2A was used to produce a negative electrode and a button cell, with the only difference that the negative electrode active material modified by zwitterionic polymer prepared in Example 4 was used in Example 4A to replace the MG11 powder that was not modified by zwitterionic polymer used in Comparative Example 2A.

The button cells of Comparative Example 2A and Example 4A were subjected to analysis, and a cycling test was carried out with a charging/discharging efficacy of 0.1 C at a voltage interval between 1 mV and 1.5 V. The expression of the first two cycles during the charging and discharging cycle test is shown in FIG. 8 and FIG. 9.

Figure 8:
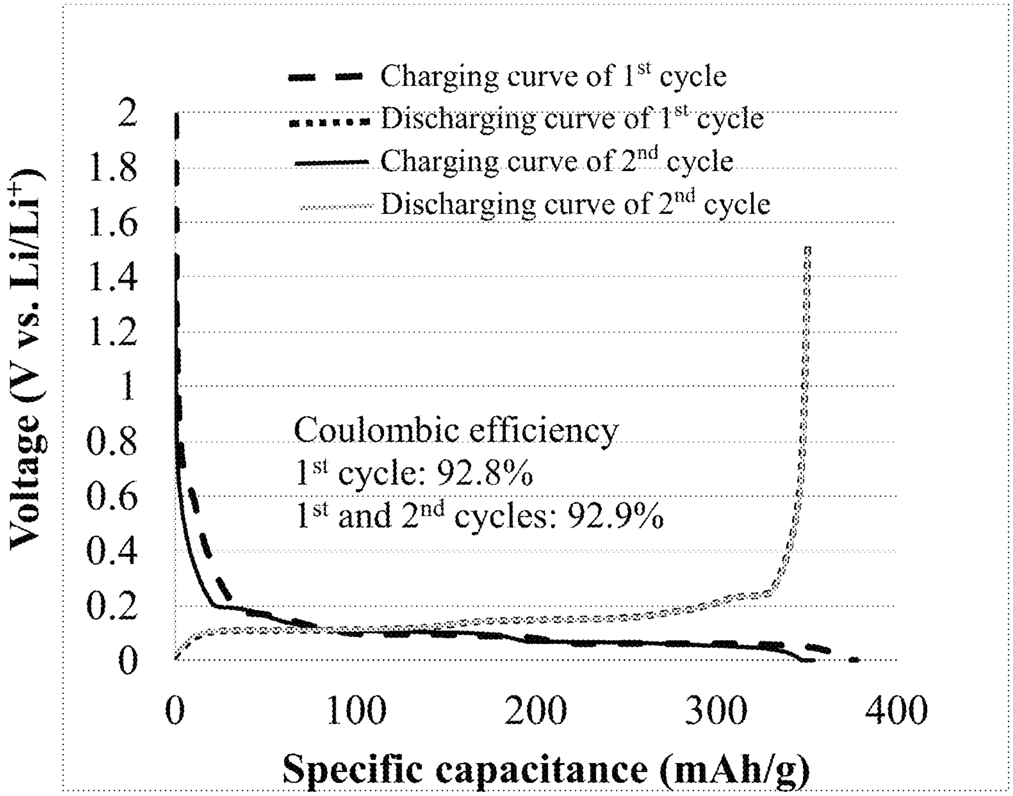
FIG. 8 is the voltage-specific capacitance diagram of the cell of Comparative Example 2A during the first two charging and discharging cycles.
Figure 9:
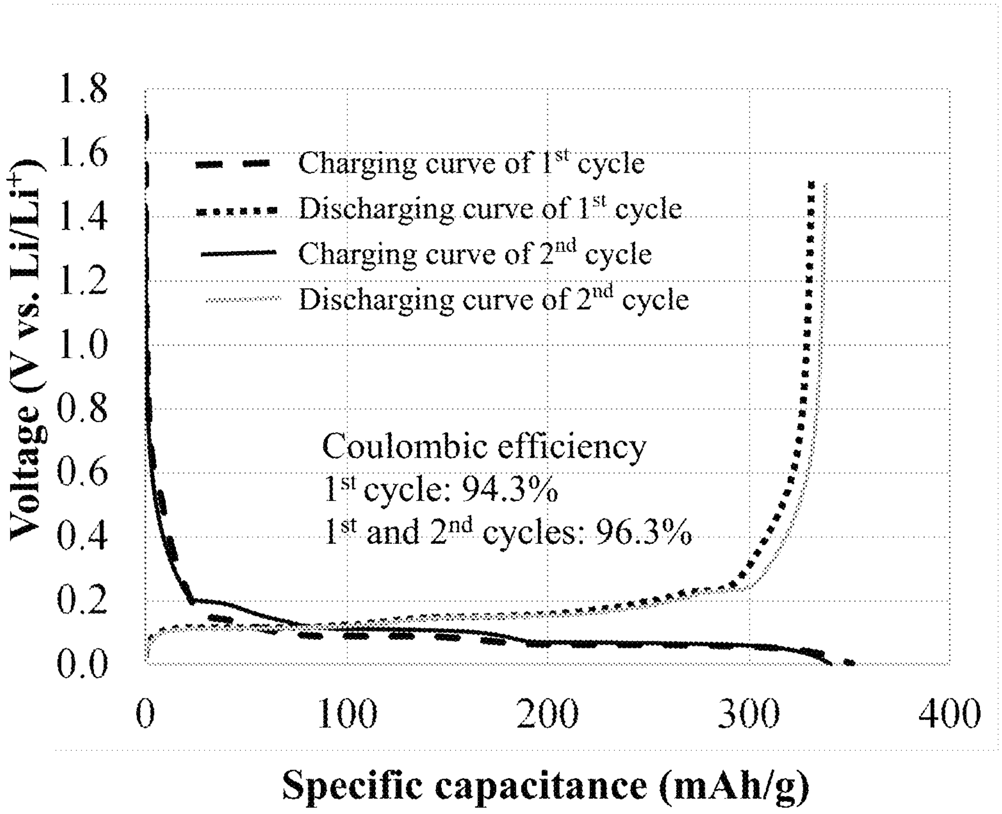
FIG. 9 is the voltage-specific capacitance diagram of the cell of Example 4A during the first two charging and discharging cycles.

As shown in FIG. 8 and FIG. 9, comparative with Comparative Example 2A, the coulombic efficiency of Example 4A in the first cycle, and in the first and the second cycles are obviously higher than the coulombic efficiency of Comparative Example 2A.

TABLE 2

Coulombic efficiency of the cells of Example 4A and Comparative Example 2A at the first ($1^{st}$) cycle, and at the first ($1^{st}$) cycle and the second ($2^{nd}$) cycle.

| Coulombic efficiency | Example 4A | Comparative Example 2A |
|---|---|---|
| $1^{st}$ cycle | 94.3% | 92.8% |
| $1^{st}$ and $2^{nd}$ cycles | 96.3% | 92.9% |

Comparative Example 3A

In this Comparative Example, nano silicon powder that was not modified by zwitterionic polymer (having a D50 of about 100 nm) was used as the negative electrode active material. The nano silicon powder used in this Comparative Example and the negative electrode active substance (nano silicon powder) used in Example 5 were the same. With a weight ratio of the negative electrode active material:Super P:PAA=80:5:15, all components were homogeneously mixed in NMP (as a solvent) to prepare a negative electrode paste. Next, the negative electrode paste was coated on a copper foil and dried, and the copper foil coated by the negative electrode paste was rolled by an external force of 1 ton/cm, then the electrode sheet was placed in a vacuum oven at 80° C. under vacuum overnight, to obtain a negative electrode.

With lithium metal used as the counter electrode and a polypropylene membrane used as the separator (having a thickness of about 20 μm, purchased from Foresight Energy Technologies Co., Ltd.), 2 drops (about 125 μL) of 1 M $LiPF_6$/DMC/EC electrolyte solution (purchased from *Formosa* Plastics Corporation) were dropped in and the whole system stood still for 12 hours to produce a button cell.

Example 5A

For Example 5A, a method similar to the method of Comparative Example 3A was used to produce a negative electrode and a button cell, with the only difference that the negative electrode active material modified by zwitterionic polymer prepared in Example 5 was used in Example 5A to replace the nano silicon powder that was not modified by zwitterionic polymer used in Comparative Example 3A.

Figure 10:
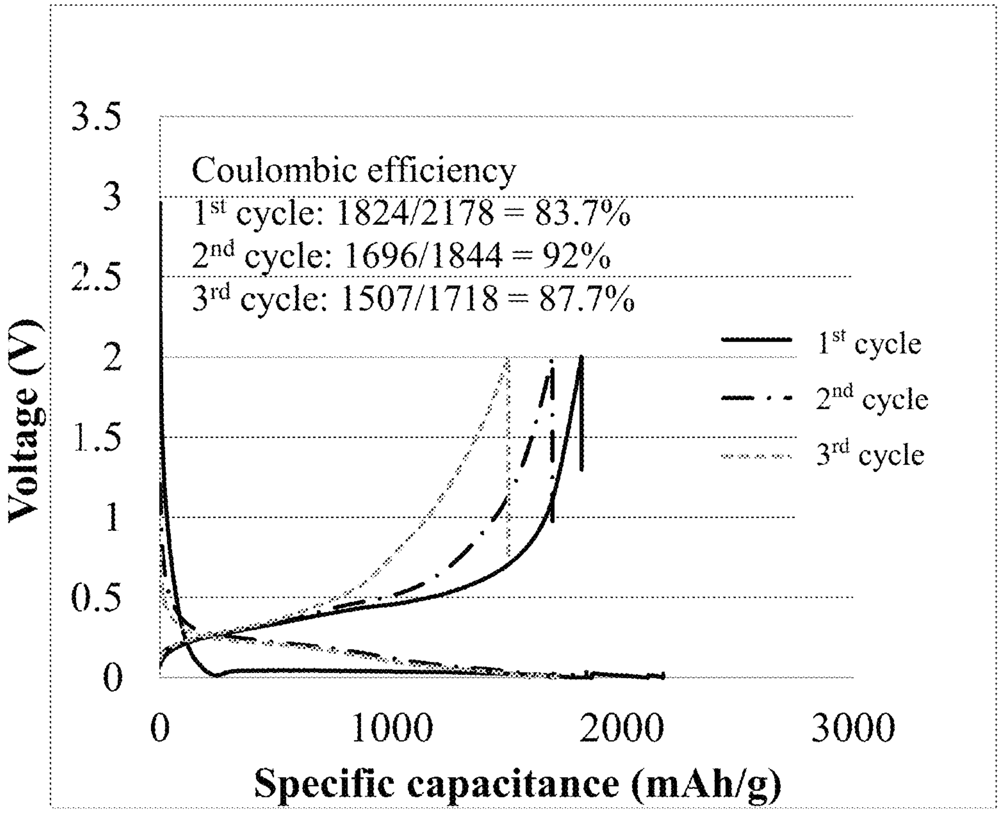
FIG. 10 is the voltage-specific capacitance diagram of the cell of Comparative Example 3A during the first three charging and discharging cycles.
Figure 11:
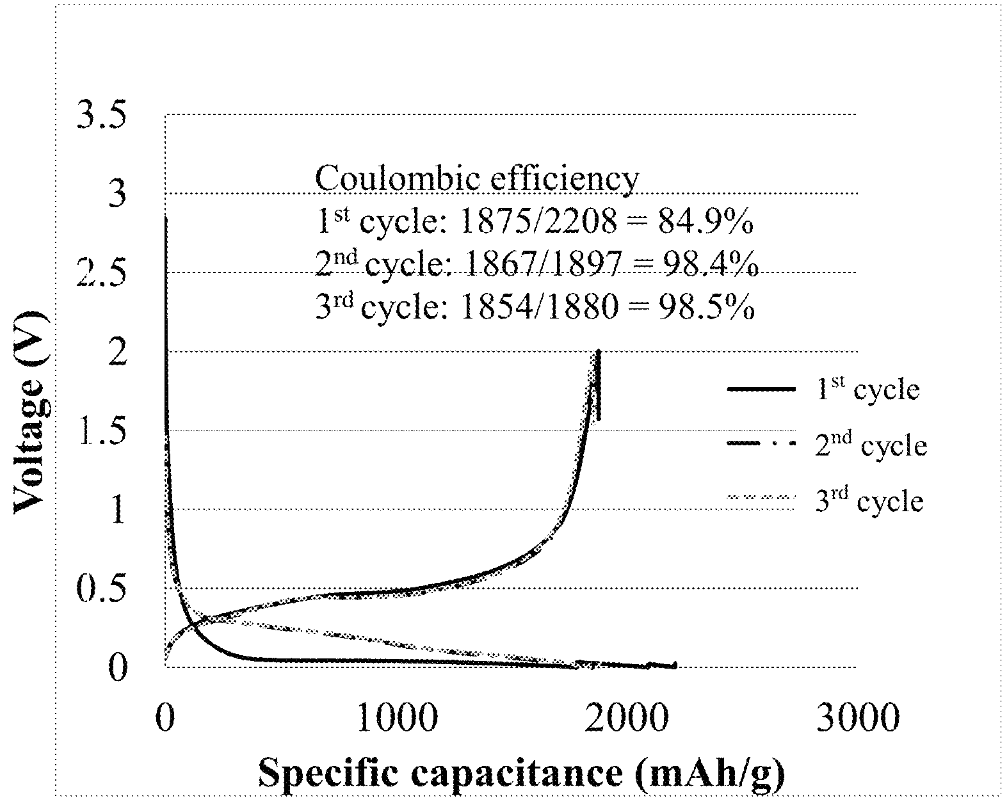
FIG. 11 is the voltage-specific capacitance diagram of the cell of Example 5A during the first three charging and discharging cycles.

The button cells of Comparative Example 3A and Example 5A were subjected to analysis, and a cycling test was carried out with a charging/discharging efficacy of 0.1 C at a voltage interval between 2 mV and 2.0 V. The expression of the first three cycles during the charging and discharging cycle test is shown in FIG. 10 and FIG. 11. The coulombic efficiency is listed in the following Table 3.

From the results of FIG. 10, FIG. 11 and Table 3, it can be found that: comparative with Comparative Example 3A, the coulombic efficiency of Example 5A at the first cycle, the second cycle and the third cycle is all higher than the coulombic efficiency of Comparative Example 3A. Particularly, in the second cycle and the third cycle of charging and discharging cycle test, the coulombic efficiency of Example 5A is obviously better than the coulombic efficiency of Comparative Example 3A.

TABLE 3

Coulombic efficiency of the cells of Example 5A and Comparative Example 3A at the first ($1^{st}$) cycle, the second ($2^{nd}$) cycle and the third ($3^{rd}$) cycle.

| Coulombic efficiency | Example 5A | Comparative Example 3A |
|---|---|---|
| $1^{st}$ cycle | 84.9% | 83.7% |
| $2^{nd}$ cycle | 98.4% | 92.0% |
| $3^{rd}$ cycle | 98.5% | 87.7% |

From the above comparison results, it is clear that when the negative electrode active powder coated by the nano-scaled layer of zwitterionic polymer of the present invention is used as the negative electrode active material, it benefits ion insertion and extraction in cells, and avoids obvious irreversible reaction; in addition, comparative with the negative electrode active powder that was not modified by zwitterionic polymer, the negative electrode active material of cells which uses lithium titanate powder, a carbon-containing material powder or a silicon-containing material powder coated with the nano-scaled layer of zwitterionic polymer of the present invention will have enhanced coulombic efficiency. By using the negative electrode active material modified by zwitterionic polymer of the present invention, the overall effectiveness of the lithium ion battery can be exactly enhanced.

What is claimed is:

1. A negative electrode active material modified by zwitterionic polymer, which comprises a negative electrode active powder and a nano-scaled layer of zwitterionic polymer coated on the negative electrode active powder.

2. The negative electrode active material modified by zwitterionic polymer according to claim 1, wherein the nano-scaled layer of zwitterionic polymer has a thickness of 10 nm to 1000 nm.

3. The negative electrode active material modified by zwitterionic polymer according to claim 1, wherein a material of the nano-scaled layer of zwitterionic polymer includes a zwitterionic polymer; the zwitterionic polymer includes a positive ion group and a negative ion group; the positive ion group is selected from the group consisting of a primary amino group, a secondary amino group, a tertiary amino group and a quaternary amino group; and the negative ion group is selected from the group consisting of a carboxylate group, a sulfonate group and a phosphate group.

4. The negative electrode active material modified by zwitterionic polymer according to claim 1, wherein the zwitterionic polymer is a carboxylated chitosan, or the zwitterionic polymer is a polysaccharide or a derivative thereof modified by a molecule comprising a zwitterionic structure, the molecule comprising a zwitterionic structure is selected from the group consisting of carboxybetaine methacrylate, phosphobetaine methacrylate, sulfobetaine methacrylate and a combination thereof; the polysaccharide or a derivative thereof is selected from the group consisting of cellulose, agar, alginic acid, starch, glycogen, heparin, chondroitin sulfate, chitin, chitosan, carboxymethyl cellulose, carboxylated chitosan, phosphorylated chitosan and a combination thereof.

5. The negative electrode active material modified by zwitterionic polymer according to claim 1, wherein the negative electrode active powder is selected from the group consisting of lithium titanate powder, mesocarbon microbead powder, artificial graphite powder, natural graphite powder, hard carbon powder, soft carbon powder, silicon powder, silicon oxide powder, silicon carbide powder and a combination thereof.

6. A negative electrode, which comprises the negative electrode active material modified by zwitterionic polymer according to claim 1.

7. The negative electrode according to claim 6, wherein the nano-scaled layer of zwitterionic polymer has a thickness of 10 nm to 1000 nm.

8. The negative electrode according to claim 6, wherein a material of the nano-scaled layer of zwitterionic polymer includes a zwitterionic polymer; the zwitterionic polymer includes a positive ion group and a negative ion group; the positive ion group is selected from the group consisting of a primary amino group, a secondary amino group, a tertiary amino group and a quaternary amino group; and the negative ion group is selected from the group consisting of a carboxylate group, a sulfonate group and a phosphate group.

9. The negative electrode according to claim 6, wherein the zwitterionic polymer is a carboxylated chitosan, or the zwitterionic polymer is a polysaccharide or a derivative thereof modified by a molecule comprising a zwitterionic structure, the molecule comprising a zwitterionic structure is selected from the group consisting of carboxybetaine methacrylate, phosphobetaine methacrylate, sulfobetaine methacrylate and a combination thereof; the polysaccharide or a derivative thereof is selected from the group consisting of cellulose, agar, alginic acid, starch, glycogen, heparin, chondroitin sulfate, chitin, chitosan, carboxymethyl cellulose, carboxylated chitosan, phosphorylated chitosan and a combination thereof.

10. The negative electrode according to claim 6, wherein the negative electrode active powder is selected from the group consisting of lithium titanate powder, mesocarbon microbead powder, artificial graphite powder, natural graphite powder, hard carbon powder, soft carbon powder, silicon powder, silicon oxide powder, silicon carbide powder and a combination thereof.

11. A cell, which comprises the negative electrode according to claim 6.

12. The cell according to claim 11, wherein the cell is a liquid lithium ion battery or a solid state lithium ion battery.

* * * * *